United States Patent Office 3,502,689
Patented Mar. 24, 1970

3,502,689
METAL BIS-DIARYLPYRAZOLINES
Harry A. Biletch, 8 Cooke Road, Lexington, Mass. 02173; Emery Nyilas, 7 Elm Brook Road, Bedford, Mass. 01730; and Imre James L. Pinter, 76 Nob Hill Drive, Framingham, Mass. 01701
No Drawing. Filed Mar. 10, 1966, Ser. No. 533,251
Int. Cl. C07f 3/00, 15/00; C08k 1/58
U.S. Cl. 260—299         5 Claims

ABSTRACT OF THE DISCLOSURE

Novel metal bis-diarylpyrazolines useful in small amounts as optical brighteners and stabilizers in polymeric materials and conforming to the structural formula:

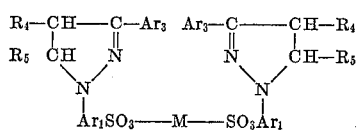

where M is a divalent metal selected from the group consisting of barium, cadmium, tin, zinc, lead, calcium, cobalt or nickel; $Ar_1$ is phenyl or phenyl substituted with alkyl, alkoxy, alkylamino, acylamino, halogen, or nitro monovalent radicals; $Ar_3$ is an aryl radical or aryl radical substituted with alkyl, alkoxy, alkylamino, hydroxy, halogen, nitro or phenoxy monovalent radicals; and $R_4$ and $R_5$ are individually, hydrogen, lower alkyl, phenyl, hydroxyphenyl, dimethyl aminophenyl, methoxyphenyl, nitrophenyl or benzyl monovalent radicals.

---

This invention relates to novel compounds useful as optical brighteners and stabilizers for use in polymeric materials and to processes for making and employing the same.

Optical brightening refers generally to the addition to a base material or substrate of a material, generally fluorescent, which absorbs light or radiation of one wavelength and re-emits at a different desired wavelength. Generally materials absorbing in the ultraviolet and emitting blue are desired, although other color combinations are useful and are disclosed herein. Absorption of invisible ultra-violet and re-emission as visible light heightens the apparent brightness of the material and counters any tendency of the base material to turn yellow with age.

Numerous 1,3-diaryl pyrazolines useful for optical brightening are known and are disclosed for example in United States Patents 2,639,990; 2,640,056 and 2,740,-793. Utility of such materials has been restricted however by poor ageing characteristics and by limited heat stability.

It has now been found that such materials having 1-aryl sulfonic acid substituents may be greatly improved in effectiveness by dimerizing through the sulfonic acid group with di-valent metal ions to provide the structure

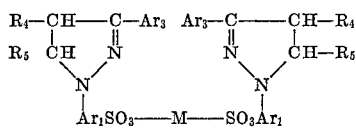

wherein M is Ba++, Cd++, Sn++, Zn++, Pb++, Ca++, Co++, or Ni++ and the other substituent symbols have meanings defined hereinafter. These metal bis-diarylpyrazolines have the important advantages not possessed by the corresponding free sulfonic acid or its alkali metal salts, of (1) increased heat resistance, (2) greater optical efficiency, (3) insolubility both in oil and water while maintaining oil compatibility, and (4) imparting stabilizing properties to a number of polymers. Whereas the parent pyrazolines have melting points generally in the range 80–200° C., the metal bis-derivatives have no measurable melting point but decompose when heated slowly at atmospheric pressure in the range 260–350° C. This materially greater heat stability is of great practical importance since it permits incorporation of the materials as hereinafter described, during hot plastic processing to disperse it therethrough. For example, they are believed to be the only known pyrazoline derivatives which are stable during melt spinning of nylon, polyesters or polyurethanes.

Since the metal ion is spectrally inactive, it would be expected that the instant dimers would be somewhat less than twice as effective as the corresponding parent pyrazoline sulfonic acids. Surprisingly, however, more than twice the efficiency has been found. For example the molecular absorption coefficient, E max., of the following bis-compounds has been found, compared to the E* max. of the parent compound:

|  | E max. | E* max. |
|---|---|---|
| (1) Ba, bis(1-p.sulfophenyl-3-5-diphenyl 2-pyrazoline) | 42,800 | 19,800 |
| (2) Ba, bis(1-p.sulfophenyl-3 styryl-5-phenyl 2-pyrazoline) | 88,400 | 34,800 |

This greater efficiency is believed to be due to steric orientation of the pyrazolines imparted by the metal linkage. The metal does not shift or otherwise adversely affect the light absorption or emission. Furthermore, the whitening and brightening effect with the dimerized metal compounds has been found to be longer lasting than water treatment with the corresponding sulfonic acid compounds suggested by the above prior art patents.

The substantial oil and water insolubility is of advantage since the additives do not migrate with plasticizer and are not removed by laundering or similar treatment. Despite this insolubility, the compounds are compatible with a large variety of plastic and compounding materials. The salts also impart good light stability and improved heat and light resistance to the base plastics, particularly vinyl chloride plastics. For this puropse, the barium and cadmium salts are preferred.

The metal dimerization disclosed herein is applicable to 1 - sulfoaryl - 3 - aryl pyrazolines generally, including specifically those disclosed in the prior art and several new ones disclosed herein. As is known, the 1-sulfophenyl substituents should have the sulfo-group in the meta or para position relative to the pyrazoline nitrogen-1. The metal bis-compounds may be made by refluxing the parent purified 1-sulfophenyl pyrazoline compound in water or water-alcohol mixtures with a water-soluble salt of the metal or with the oxide or carbonate of the metal. Preferably however, the sometimes difficult steps of isolating and purifying the parent compound are avoided by forming the metal salt of the sulfophenyl reactant used to form the parent pyrazoline compound, as illustrated below. The bis metal salt is then formed directly in the pyrazoline forming reaction, a compound relatively easy to isolate and purify.

As shown for example in United States Patents Nos. 2,640,056, 2,639,990 and 2,740,793, especially 2,640,056, sulfodiaryl pyrazolines may be made by condensing a compound of the formula $$(R_5)CH=C(R_4)—CO—Ar_3 \qquad (I)$$

or $$R_1R_2N(R_5)CH—CH(R_4)—CO—AR_3 \qquad (II)$$

with an aryl hydrazine sulfonic acid. In accordance with the above preferred procedure for making the corresponding metal bisparazolines, Compound I or II is reacted with an aryl hydrazine of the formula:

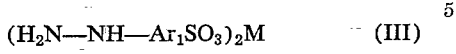

Compound III can be formed by reacting the aryl hydrazine sulfonic acid with a water-soluble salt of the metal M or with an oxide or carbonate of the metal. This can be done as shown in the examples below directly in the reaction mixture to obtain the final metal-bis compound in a single step from which the product is easily recovered and purified.

In the above structure, the spectrally active portion of the molecule is believed to be the

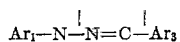

structure. Consequently, $R_4$ and $R_5$ substitutents are optically not important although they can be used to impart or limit reactivity or other properties.

In the above structural formula, it has been found that the substituents may vary widely and can comprise any of the following:

$Ar_1$ may be phenyl or phenyl substituted with alkyl, alkoxy, alkylamino, acylamino, halogen or nitro radicals;

$Ar_3$ may be aryl radicals such as phenyl, styryl, biphenyl, 1-naphthyl or 2-naphthyl or aryl radicals substituted with alkyl, alkoxy, alkylamino, acylamino, hydroxy, halogen, nitro or phenoxy radicals;

$R_4$ and $R_5$ may each be hydrogen or a hydrocarbon or substituted hydrocarbon radical such as lower alkyl, phenyl, hydroxy-phenyl, dimethylamino-phenyl, methoxy-phenyl, nitrophenyl or benzyl monovalent radicals.

Examples include the prior art 1,3-diaryl pyrazolines dimerized as hereinabove suggested. Those not already containing a sulfo radical on the 1-phenyl substituent may be made by employing an aryl hydrazine sulfonic acid in the synthesis.

Specific examples of such compounds with their maximum wavelength (mμ) of absorption as determined in approximately $5 \times 10^{-5}$ molar aqueous solutions are:

TABLE I

| Compounds: | Max. |
|---|---|
| (1) Ba bis(1-p-sulfophenyl-3-phenyl 2-pyrazoline) | 348 |
| (2) Ba bis(1-p-sulfophenyl-3-phenyl-5-methyl 2-pyrazoline) | 349 |
| (3) Ba or Cd bis(1-p-sulfophenyl-3,5-diphenyl 2-pyrazoline) | 355 |
| (4) Ba or Cd bis(1-m-sulfophenyl-3,5-diphenyl 2-pyrazoline) | 350 |
| (5) Sn(II) bis(1 - m-sulfophenyl-3-p-tolyl-5-phenyl 2-pyrazoline) | 345 |
| (6) Ba or Cd bis(1-p-sulfophenyl-3-p-phenoxyphenyl-5-phenyl 2-pyrazoline) | 358 |
| (7) Ba or Cd bis(1-o-methoxy-p-sulfophenyl-3,5-diphenyl 2-pyrazoline) | 358 |
| (8) Ba or Cd bis(1-p-sulfophenyl-3-p-methoxyphenyl-5-phenyl 2-pyrazoline) | 350 |
| (9) Ba or Cd bis(1-p-sulfophenyl-3-p-acetamidophenyl-5-phenyl 2-pyrazoline) | 351 |
| (10) Ba or Cd bis(1-p-sulfophenyl-3-p-chlorophenyl-5-phenyl 2-pyrazoline) | 358 |
| (11) Ba or Cd bis(1-p-sulfophenyl-3-phenyl-5-o-hydroxyphenyl 2-pyrazoline) | 347 |

The above compounds are fluorescent and principally absorb in the ultraviolet and emit in the blue. Novel compounds which absorb longer wavelengths and emit in the green, yellow, orange and red wavelengths, together with the absorption max. in mμ are given in Table II.

TABLE II

| Compounds: | Max. |
|---|---|
| (12) Ba or Cd bis(1-p-sulfophenyl-3-p-nitrophenyl-5-phenyl 2-pyrazoline) | 427 |
| (13) Ba or Cd bis(1-m-sulfophenyl-3-p-nitrophenyl-5-phenyl 2-pyrazoline) | 423 |
| (14) Ba or Cd bis(1-p-sulfophenyl-3-m-nitrophenyl-5-phenyl 2-pyrazoline) | 395 |
| (15) Sn(II) bis(1 - m-sulfophenyl-3-m-nitrophenyl-5-phenyl 2-pyrazoline) | 390 |
| (16) Ba or Cd bis(1-p-sulfophenyl-3-(1′naphthyl) 5 - phenyl 2-pyrazoline) | 373 |
| (17) Ba or Cd bis(1-p-sulfophenyl-3-(2′naphthyl)-5-phenyl 2-pyrazoline) | 368 |
| (18) Ba or Cd bis(1-p-sulfophenyl-3-(4′-biphenylyl)-5-phenyl 2-pyrazoline) | 373 |
| (19) Ba or Cd bis(1-p-sulfophenyl-3-(2′-fluorenyl)-5-phenyl 2-pyrazoline) | 378 |
| (20) Ba or Cd bis(1-sulfophenyl-3-styryl-5-phenyl 2-pyrazoline) | 370 |
| (21) Sn(II) bis(1 - m-sulfophenyl-3-styryl-5-phenyl 2-pyrazoline) | 368 |
| (22) Ba or Cd bis(1-p-sulfophenyl-3-p-dimethylaminostyryl - 5-p-dimethyl-aminophenyl 2-pyrazoline) | 368 |
| (23) Ba or Cd bis(1-p-sulfophenyl-3-p-methoxystyryl-5-p-methoxyphenyl 2-pyrazoline) | 372 |
| (24) Ba or Cd bis(1-o-nitro-p-sulfophenyl-3-styryl-5-phenyl 2-pyrazoline) | 418 |
| (25) Ba or Cd bis(1-p-sulfophenyl-3-p-nitrostyryl-5-p-nitrophenyl 2-pyrazoline) | 448 |

Specific examples of preparation are given below for purposes of illustration:

EXAMPLE 1

Barium bis(1-p-sulfophenyl-3,5-diphenyl 2-pyrazoline)

To 208 parts by weight of benzalacetophenone dissolved in 159 parts (by wt.) of hot methanol are added 600 parts (by wt.) of hot water containing 519 parts (by wt.) of p-hydrazinobenzene sulfonic acid (38%) and 140 parts (by wt.) of barium acetate. The resulting mixture is boiled with vigorous agitation, under reflux for 3 hours. After cooling, collecting the precipitate by filtration, washing successively with hot water and methanol, and drying, 402–412 parts (by wt.) (i.e., 90–92%) of the product are obtained which has a molar extinction coefficient of 42,800 at 355 mμ (in water).

EXAMPLE 2

Barium bis(1-o-methoxy-m-sulfophenyl-3,5-diphenyl 2-pyrazoline)

A freshly prepared mixture of 229 parts by weight of p-methoxy-m hydrazinobenzene sulfonic acid (obtained by the diazotation of 336 parts (by wt.) of o-anisidine-3-sulfonic acid and subsequent reduction of the corresponding diazonium salt with stannous chloride), and 140 parts (by wt.) of barium acetate in 750 parts (by wt.) of warm water is added to a solution of 208 parts (by wt.) of benzalacetophenone in 190 parts (by wt.) of warm methanol. The reaction mixture is stirred vigorously at 45–50° C. for one hour, and under reflux for 5 hours. After cooling, the precipitate is collected on a filter, washed successively with hot water and methanol, and air dried yielding 362–380 parts (by wt.) (i.e., 76–80%) of the product which has a molar extinction coefficient of 34,800 at 360 mμ (in water).

EXAMPLE 3

Barium bis(1-p-sulfophenyl-3-styryl-5-phenyl 2-pyrazoline)

To a boiling solution of 234 parts by weight of dibenzalacetone in 500 parts (by wt.) of methanol is added a mixture of 519 parts (by wt.) of p-hydrazino benzene sulfonic acid (38%) and 140 parts (by wt.) of barium acetate in 600 parts (by wt.) of hot water. The reaction mixture is boiled, with efficient stirring, for 5 hours, cooled to room temperature and filtered. The collected precipitate washed successively with hot water and warm methanol affords, after drying at 70° C., 392–406 parts (by wt.) (i.e., 83–86%) of the product which has a molar extinction coefficient of 88,400 at 370 m$\mu$ (in water).

EXAMPLE 4

Barium bis(1-o-nitro-p-sulfophenyl-3-styryl-5-phenyl 2-pyrazoline

A mixture of 233 parts by weight of m-nitro-p-hydrazinobenzene sulfonic acid (obtained from 288 parts (by wt.) of m-nitro-p-aminobenzene sulfonic acid by the diazotation thereof and reduction of the corresponding diazonium salt with stannous chloride) and 140 parts (by wt.) of barium acetate in 800 parts (by wt.) of hot water is run into a hot solution of 234 parts (by wt.) of dibenzalacetone in 800 parts (by wt.) of methanol. After boiling under reflux with efficient agitation for six hours, the precipitated product is collected, and washed, successively with hot water and methanol. The yield corresponds to 449–460 parts (by wt.) (i.e., 87–89%)) of the product which exhibits a molar extinction coefficient of 74,600 at 418 m$\mu$ (in water).

EXAMPLE 5

A solution of 1 part by weight of barium bis(1-p-sulfophenyl-3,5-diphenyl 2-pyrazoline) in 50 parts (by wt.) of tetrahydrofurane is intensively blended with 1000 parts (by wt.) of a commercial grade, powderized nylon 6 resin (spec. gravity 1.13) to obtain a homogeneous mixture which is subsequently oven-dried to remove the solvent. The composition so obtained is passed with 12,000 p.s.i. pressure, through the heating zone of a melt spinning apparatus at 275–280° C. and through the spinneret having a head temperature of about 300° C., and fabricated into a yarn. The product shows no inhomogenity, its tensile strength is within 10% of that of the control as determined by ASTM D–638, displays a bluish hue in natural light and, because of its brightness, appears more attractive than an untreated control.

EXAMPLE 6

A mixture of 80 parts by weight of a commercial grade powderized nylon 6/6 resin (spec. gravity 1.13) and 20 parts (by wt.) barium bis(1-p-sulophenyl-3,5-diphenyl 2-pyrazoline) is thoroughly dry blended and extruded with the aid of 1 part (by wt.) of an Acrowax lubricant, at 285° C. head temperature, on a conventional equipment having a barrel length to diameter ratio of 16:1. The extrudate is quenched in hot water, pelletized and ground.

A pipe autoclave which had been charged with a mixture of 328 parts (by wt.) of hexamethylenediamineadipic acid salt (M.P. 196–7° C.) and 1.65 parts (by wt.) o fthe extrudate obtained as above, is evacuated, purged with dry nitrogen, heated under vauum at 210–220° C. internal temperature for 2 hours and at 275–285° C. under a slow stream of nitrogen for additional 2 hours. Without cooling, the polymer composition is transferred to a conventional melt spinning apparatus and extruded to a yarn as described in Example 5.

EXAMPLE 7

A mixture of 1000 parts by weight of a commercial grade polyvinyl chloride resin powder (spec. gravity 1.35–1.40, ASTM–D–1243/B viscosity 0.245–0.450) containing heat stabilizer and filler, is compounded with 850 parts (by wt.) of dioctyl phthalate plasticizer in which 2.5 parts (by wt.) of cadmium bis(1-p-sulfophenyl-3,5-diphenyl 2-pyrazoline) had been dispersed. The resulting soggy composition is thoroughly hot milled and subsequently fabricated to a sheeting of 25 mils thickness by standard calendering process. The product appears whiter than an untreated control and shows no blue streaks under ultraviolet light. When exposed to aging to 130°–150° F. and 90% relative humidity in a weatherometer having a double carbon-arc, the sample containing the metal bispyrazoline derivative shows yellowing after 140–160 hours. whereas the control shows the same effect after only 110–120 hours of the same exposure.

EXAMPLE 8

A mixture of 4 parts by weight of cadmium bis(-1-p-sulfophenyl-3-styryl-5-phenyl 2-pyrazoline) and 96 parts (by wt.) of a commercial extrusion grade acrylonitrile-butadiene-styrene (spec. gravity 1.04) pelletized resin is dry-tumbled, and the resulting composition is passed, at 350° F. head temperature, through a conventional extruding apparatus having a barrel length to diameter ratio of 16:1. The extrudate is quenched in cold water and repelletized.

In a Banbury-mixer, 100 parts (by wt.) of the pelletized concentrate obtained as above are blended with 4000 parts (by wt.) of the same ABS resin containing 0.5% of a commercial grade, green cadmium pigment. The resulting composition is extruded on a conventional apparatus to sheeting of 35 mils thickness which shows strong green fluorescence under ultraviolet illumination, and appears more bright in natural light than an untreated control.

The foregoing metal bis 1-3 diaryl pyrazolines can be added in small quantity to improve the color, brightness, heat resistance and ageing properties of many materials. Amounts are not critical, from about 0.01 to about 2.5% by weight being preferred and about 0.02 to 0.05% being most preferred. They may be added in any suitable way to natural polymeric materials such as wool, cotton or regenerated cellulose. More importantly, they can be added to synthetic plastics, either clear, dyed, translucent, or pigmented, for example cellulose esters such as acetate, butyrate and nitrate and mixed esters such as acetate-butyrate or acetate-propionate; pure and mixed vinyl polymers, copolymers, and terpolymers including polyalkylenes, ethers, esters, acetals and halogenated materials, acrylates, butadiene, isoprene, acrylonitriles, rubber, styrene and vinyltoluene; polyamides such as nylons 6, 6/6, 6/10 and 6/11; pure and mixed polyesters and their copolymers including alkyds and polycarbonates; urethane polymers and prepolymers; and epoxy polymers and prepolymers. They may be in any suitable form such as molded, extruded or cast articles, calendered films, filaments, yarns, blown foams, or liquid formulations such as floor finishes. For brevity these materials and the like are herein referred to as polymeric materials. The instant bis-metal pyrazolines can be added to the base material in any suitable way, including topical application from liquid suspension or solution, for example in tetrahydrofurane, dimethyl formamide, or dimethyl acetamide. More preferably however, they are dispersed directly into the body of the base polymeric mass during compounding and processing. They may be blended, for example, in plasticizer or raw polymeric material in bead, pellet or melt condition prior to conversion to the final desired form. This can be accomplished by customary procedures such as dry-blending, co-extrusion, hot milling or Banbury mixing procedures or simple addition to resin latexes. They may also be incorporated in the reactants from which the polymeric material is formed, typically at about 300° C. This intimate and uniform dispersion of pyrazoline material, substantially oil and water insoluble, within the base material has the advantage of permanence. They are not removed by plasticizer migration, wear, or subsequent treatment. Inclusion in many monomer mixes prior to polymerization has been found not significantly to affect adversely either the resulting resin or the pyrazolines. They are the only known pyrazoline derivatives possessing such inertness and heat stability. For example, the barium, cadmium, or tin bis (1-p-sulfophenyl-3,5-diphenyl 2-pyrazoline) may be included as a pure powder dispersed in hexamethylene diamine and adipic acid or diethyl adipate and subjected to melt polymerization at 210–280° C. The resulting nylon 6/6 contains the unaltered metal bispyrazoline as a fine dispersion.

It should be understood that the foregoing description is for the purpose of illustration and that the invention includes modifications within the scope of the appended claims.

We claim:

1. A fluorescent metal bisdiarylpyrazoline compound having the formula

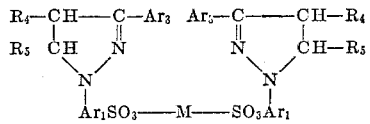

wherein M is a divalent metal selected from the group consisting of barium, cadmium, tin, zinc, calcium, cobalt or nickel; $Ar_3$ is phenyl substituted with lower alkyl, lower alkoxy, lower alkylamino, hydroxy, halogen, nitro or phenoxy monovalent radicals; $Ar_1$ is phenyl or $Ar_3$; and $R_4$ and $R_5$ are individually hydrogen, lower alkyl, phenyl, hydroxyphenyl, dimethylaminophenyl, methoxyphenyl, nitrophenyl or benzyl monovalent radicals.

2. A compound according to claim 1 comprising metal bis(1-p-sulfophenyl-3,5-diphenyl 2-pyrazoline).

3. A divalent metal bis(1-p-sulfophenyl-3-p-nitrophenyl-5-phenyl 2-pyrazoline) where the divalent metal is selected from the group consisting of barium, cadmium, tin, zinc, calcium, cobalt or nickel.

4. A divalent metal bis(1-o-methoxy-p-sulfophenyl-3-p-nitrophenyl-5-phenyl-2-pyrazoline) where the divalent metal is selected from the group consisting of barium, cadmium, tin, zinc, calcium, cobalt or nickel.

5. A fluorescent metal bisdiarylpyrazoline compound having the formula

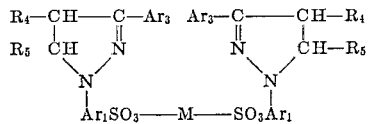

wherein M is a divalent metal selected from the group consisting of barium, cadmium, lead, tin, zinc, calcium, cobalt or nickel; $Ar_3$ is phenyl substituted by lower alkylamino, halogen, nitro or phenoxy monovalent radicals; $Ar_1$ is phenyl or $Ar_3$; and $R_4$ and $R_5$ are individually hydrogen, lower alkyl, phenyl, hydroxyphenyl, dimethylaminophenyl, methoxyphenyl, nitrophenyl or benzyl monovalent radicals.

References Cited

Treibs et al.: Ber. Deut. Chem., vol. 84, pp. 433–438 (1951).

ALTON D. ROLLINS, Primary Examiner

U.S. Cl. X.R.

260—45.75, 45.8, 240, 310, 814, 2.5; 252—301.2